(12) United States Patent
Shiomi et al.

(10) Patent No.: US 6,495,288 B2
(45) Date of Patent: Dec. 17, 2002

(54) LEAD-ACID BATTERY HAVING TIN IN POSITIVE ACTIVE MATERIAL AND SILICA IN SEPARATOR

(75) Inventors: Masaaki Shiomi, Kyoto (JP); Yuichi Okada, Kyoto (JP); Tadashi Shiroya, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 178 days.

(21) Appl. No.: 09/729,172

(22) Filed: Dec. 5, 2000

(65) Prior Publication Data

US 2001/0000239 A1 Apr. 12, 2001

Related U.S. Application Data

(63) Continuation of application No. 08/995,135, filed on Dec. 19, 1997, now Pat. No. 6,225,005.

(30) Foreign Application Priority Data

Dec. 19, 1996 (JP) .............................. 8-355176
Dec. 24, 1996 (JP) ............................ 8-356003
Jan. 10, 1997 (JP) .............................. 9-14601

(51) Int. Cl.[7] .......................... H01M 4/56; H01M 6/00
(52) U.S. Cl. ...................... 429/225; 429/226; 429/300; 429/302; 429/218.1; 429/247; 429/248; 429/251; 429/252; 29/623.1
(58) Field of Search ................................ 429/225, 226, 429/300, 302, 218.1, 247, 248, 251, 252; 29/623.1

(56) References Cited

U.S. PATENT DOCUMENTS

| | | | |
|---|---|---|---|
| 4,735,870 A | | 4/1988 | Rowlette |
| 4,889,778 A | * | 12/1989 | Misra et al. ................. 429/190 |
| 5,225,298 A | * | 7/1993 | Nakayama et al. .......... 429/252 |
| 5,820,639 A | * | 10/1998 | Snyder et al. ............. 29/623.5 |

FOREIGN PATENT DOCUMENTS

EP          0586059        3/1994

OTHER PUBLICATIONS

Patent Abstracts of Japan, vol. 017, No. 353 (E–1393), Jul. 5, 1993 for JP–A–5–54881.
Patent Abstracts of Japan, vol. 096, No. 011, Nov. 29, 1996 for JP–A–8–180876.
Patent Abstracts of Japan, vol. 016, No. 166 (E–1193), Apr. 22, 1992 for JP–A–4–14758.

* cited by examiner

*Primary Examiner*—Carol Chaney
*Assistant Examiner*—Angela J Martin
(74) *Attorney, Agent, or Firm*—Sughrue Mion, PLLC

(57) ABSTRACT

In a lead-acid battery, a positive active material includes tin in an amount of from not less than 0.2% to not more than 5% based on the weight thereof. The density of the positive active material after formation is from not less than 3.75 g/cc to not more than 5.0 g/cc. When the lead-acid battery is produced by a battery container formation, a time required between the injection of an electrolyte and the beginning of battery container formation is from not less than 0.1 hours to not more than 3 hours.

7 Claims, 8 Drawing Sheets

LEAD-ACID BATTERY HAVING TIN IN POSITIVE ACTIVE MATERIAL AND SILICA IN SEPARATOR

This application is a continuation of U.S. patent application Ser. No. 08/995,135, filed on Dec. 19, 1997, which is now U.S. Pat. No. 6,225,005.

BACKGROUND OF THE INVENTION

1. Field of the Invention

The present invention relates to the enhancement of discharge properties and endurance of lead-acid battery.

2. Description of the Related Art

A lead-acid battery has been widely applied as an inexpensive reliable high safety secondary battery for SLI (Starting, Lighting and Ignition) and other purposes. However, a lead-acid battery has a low specific energy that gives a serious obstacle to the development of its application to EV (electric vehicle), etc.

Many methods have long been studied to enhance the specific energy of lead-acid battery. One of these proposed methods is to add tin in the positive active material to enhance the discharge properties of the lead-acid battery. However, this approach is disadvantageous in that tin thus added is eluted from the positive active material with the electrolyte and then deposited on the negative plate to lower the hydrogen overvoltage of the negative plate and hence cause much lead sulfate to be accumulated on the negative plate, thereby reducing the endurance of the lead-acid battery.

SUMMARY OF THE INVENTION

It is an object of the present invention to enhance the specific energy of a lead-acid battery by adding tin into a positive active material as well as to prevent the reduction of endurance of a lead-acid battery by inhibiting the deposition of tin on the negative plate.

In a lead-acid battery according to the present invention, a positive acid material includes tin in an amount of from not less than 0.2% to not more than 5% based on the weight thereof. The density of the positive active material after formation is from not less than 3.75 g/cc to not more than 5.0 g/cc. When the lead-acid battery is produced by a battery container formation, a time required between the injection of an electrolyte and the beginning of battery container formation is from not less than 0.1 hours to not more than 3 hours.

According to the present invention, it is possible to remarkably improve the discharge properties and endurance of lead-acid batteries.

DETAILED DESCRIPTION OF THE INVENTION

Figure 1:
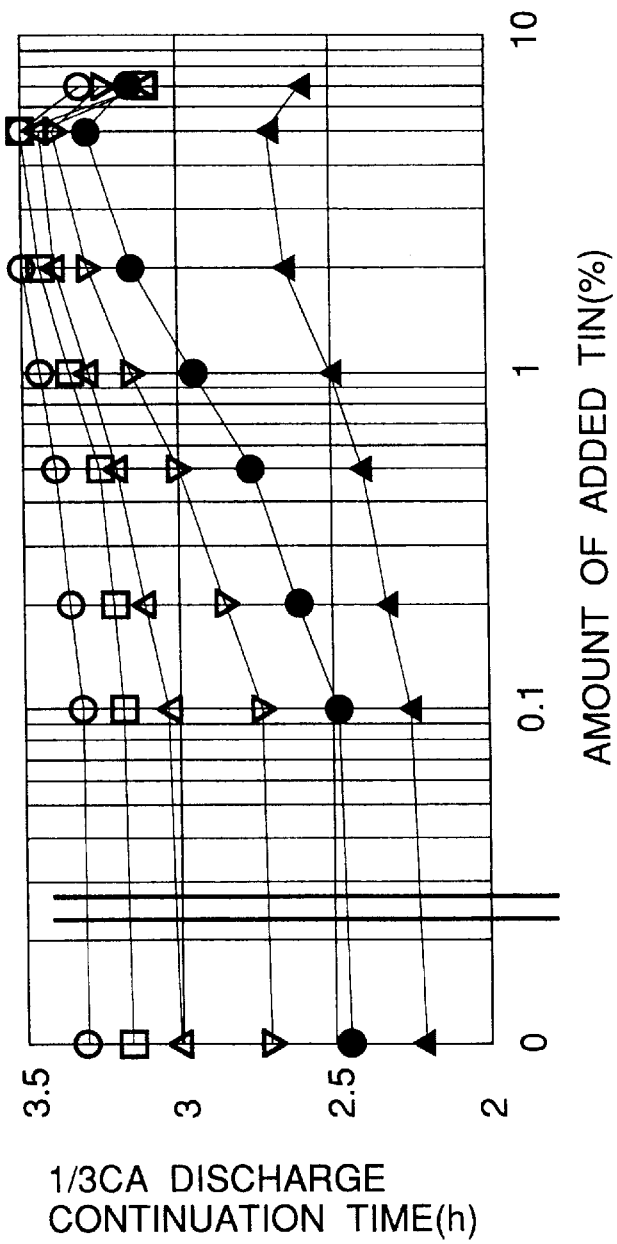
FIG. 1 is a characteristic diagram illustrating the relationship between the added amount of tin and the positive active material density and the discharge capacity.

We made extensive studies of method for inhibiting the elution of tin from the positive plate. As a result, it was found that the amount of tin to be eluted from the positive active material is related with the density of positive active material and the higher the active material density is, the more difficulty can be eluted tin. The relationship between the amount of tin to be added and the density of positive active material was extensively studied. As a result, it was found that the presence of tin in the positive active material in an amount of from not less than 0.2% to not more than 5% and the restriction of the density of positive active material after formation to a range of from not less than 3.75 g/cc to not more than 5.0 g/cc make it possible to enhance the specific energy while preventing the reduction of endurance of the lead-acid battery.

It was further found that tin added in the positive plate can be easily eluted particularly while the battery is allowed to stand for a period of time between the injection of the electrolyte into the battery and the passage of electric current for battery container formation and the less the time during which the battery is allowed to stand is, the less is the eluted amount of tin. The relationship between the time during which the battery is allowed to stand and the eluted amount of tin was extensively studied. As a result, it was found that the restriction of the time during which the battery is allowed for a period of time between the injection of the electrolyte into the battery and the beginning of battery container formation to stand to a range of from not less than 0.1 hours to not more than 3 hours, preferably from not less than 0.2 hours to not more than 1 hour, makes it possible to inhibit the elution of tin and hence the reduction of the battery endurance.

Further, if the present invention was applied to a valve-regulated lead-acid battery, when a separator including powdered silica having a specific surface area of from 50 to 500 $m^2/g$ added therein causes tin eluted from the positive plate to be adsorbed by silica in the separator was used, it was possible to further reduce the deposition of tin on the negative plate.

Moreover, when the electrolyte was gelled with colloidal silica retards the migration of tin eluted from the positive plate, it was possible to further reduce the deposition of tin on the negative plate.

The plate invention will be described in more detail along with the following examples.

EXAMPLE 1

A tin sulfate solution obtained by thoroughly stirring a mixture of tin sulfate with water for use in paste kneading was added to an active material in an amount of 0.1%, 0.2%, 0.5%, 1.0%, 2.0%, 5.0% and 7.0% based on the weight thereof as calculated in terms of tin. For each amount paste, six pastes having different active material densities (active material density after formation: 3.5, 3.75, 4.0, 4.5, 5.0 and 5.5 g/cc) were filled in a grid made of Pb-0.08%Ca-1.5%Sn alloy, and then subjected to curing and formation to prepare 42 kinds of formed positive plate plates having a thickness of 2.2 mm.

11 sheets of each of these positive plates, 12 sheets of formed paste type negative plates having a thickness of 1.7 mm and a fine glass fiber separator were assembled into an about 60 Ah(3 hr)–12V AGM (absorptive grass mat) type valve-regulated battery by an ordinary preparation method. A battery having a tin sulfate-free electrode plate was also prepared. These batteries were then subjected to injection of electrolyte and charging according to an ordinary method. These batteries were then subjected to the following tests.

These batteries were measured for ⅓ CA discharge capacity at 30° C. The test results are set forth in FIG. 1. As can be seen in FIG. 1, when the added amount of tin sulfate is 0.1%, there is little or no effect of increasing the discharge capacity. When the added amount of tin sulfate is from 0.2 to 5.0%, the more the added amount of tin sulfate is, the greater is the discharge capacity. However, when the added amount of tin sulfate exceeds 5%, the discharge capacity no longer increases but decreases. Further, the greater the density of positive active material is, the lower is the discharge capacity. In particular, when the density of positive active material is 5.5 g/cc and the added amount of tin sulfate is none or 0.1%, the discharge capacity does not reach even 80% of the rated value.

Figure 2:
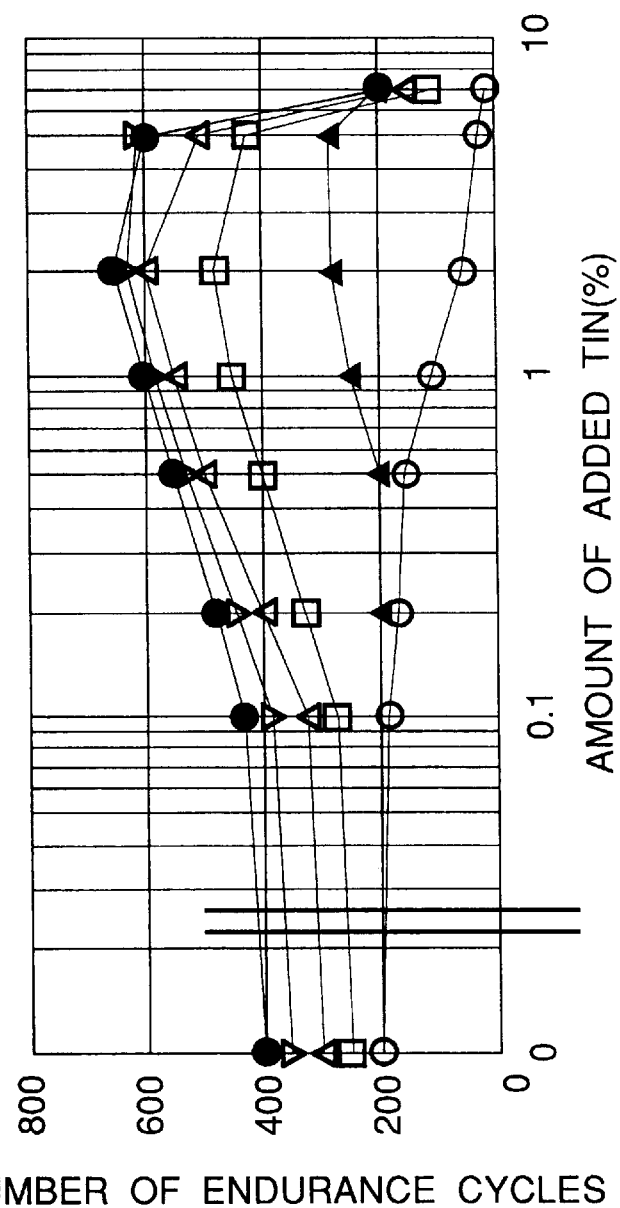
FIG. 2 is a characteristic diagram illustrating the relationship between the added amount of tin and the positive active material density and the battery endurance.

These batteries were subjected to endurance test. The endurance test was carried out under ordinary conditions. In some detail, the battery was discharged by 80% of the rated capacity at 40° C. and ⅓ CA constant current, and then charged by 110% of the charged capacity at 0.1 CA constant current. The point at which the capacity falls below 80% of the rated value is defined as the end of endurance. The batteries whose capacity did not reach 80% of the rated value had too low a capacity to undergo the endurance test. The results are set forth in FIG. 2. When the density of positive active material falls below 3.75 g/cc, the greater the added amount of tin sulfate is, the less is the endurance of the battery. When the density of positive active material is not less than 3.75 g/cc, the battery exhibits excellent initial properties as well as long endurance as compared with those consisting of a positive plate having the same density of active material as above but free of tin sulfate.

Figure 3:
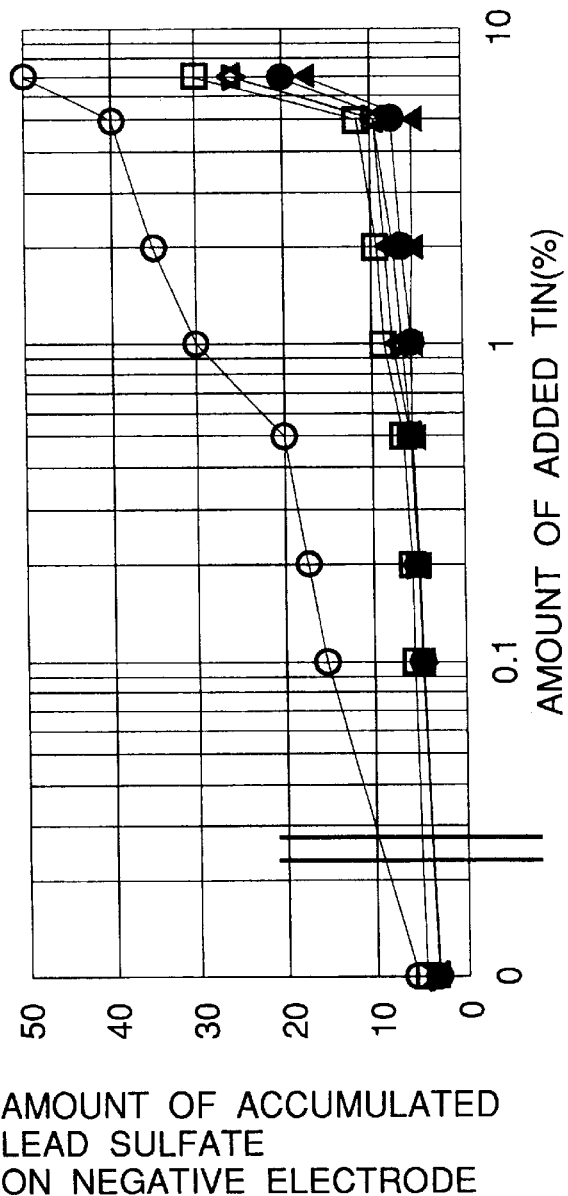
FIG. 3 is a characteristic diagram illustrating the relationship between the added amount of tin and the positive active material density and the amount of lead sulfate accumulated on the negative plate.

After the endurance test, the batteries were disassembled, and then analyzed for the amount of lead sulfate accumulated on the negative plate. The results are set forth in FIG. 3. As can be seen in FIG. 3, when a positive plate having an positive active material density of less than 3.75 g/cc is sued, the amount of lead sulfate accumulated on the negative plate increases depending on the amount of tin added in the positive plate, showing an adverse effect of tin. When the density of positive active material is not less than 3.75 g/cc and the amount of tin added in the positive active material is not more than 5%, the amount of lead sulfate accumulated on the negative plate is very small. When the amount of tin added in the positive active material is 7%, a large amount of tin is deposited on the negative plate and lead sulfate is accumulated on the negative plate in a remarkably great amount even if the density of positive active material is raised.

As can be seen in the foregoing results, when the density of positive active material is low, tin added in the positive plate is eluted with the electrolyte and then later deposited on the negative plate plate, thereby reducing the battery endurance. In order to keep tin added in the positive plate plate, it is necessary that the positive plate has an active material density suitable for the amount of tin added as in the present invention.

The present example has been described with reference to the application of the present invention to a AGM type battery. Even if the present invention was applied to a liquid flooded type battery, similar effects were obtained.

EXAMPLE 2

A tin sulfate solution obtained by thoroughly stirring a mixture of tin sulfate with water for use in paste kneading was added to an active material in an amount of 0.1%, 0.2%, 0.5%, 1.0%, 2.0%, 5.0% and 7.0% based on the weight thereof as calculated in terms of tin. These pastes were filled in a grid made of Pb-0.08%Ca-1.5%Sn alloy, and then subjected to curing to prepare unformed positive plates (active material density after formation: 4.7 g/cc) having a thickness of 2.2 mm.

11 sheets of each of these positive plate plates, 12 sheets of unformed paste type negative plate plates having a thickness of 1.7 mm and a particulate glass fiber separator were assembled into an about 60 Ah(3 hr)–12V retainer type valve-regulated battery by an ordinary preparation method. A battery having tin sulfate-free electrode plate was also prepared. These batteries were then subjected to injection of electrolyte. After 3 minutes, 6 minutes, 12 minutes, 42 minutes, 1 hour, 3 hours and 5 hours, these batteries were subjected to battery container formation at 7A constant current for 64 hours. These batteries were measured for ⅓ CA discharge capacity at 30° C. These batteries were subjected to endurance test. The endurance test was effected under ordinary conditions. In some detail, the battery was discharged by 80% of the rated capacity at 40° C. and ⅓ CA constant current, and then charged at 0.2 CA constant current and 14.4V constant voltage for 8 hours. The point at which the capacity falls below 80% of the rated value is defined as the end of endurance.

Figure 4:
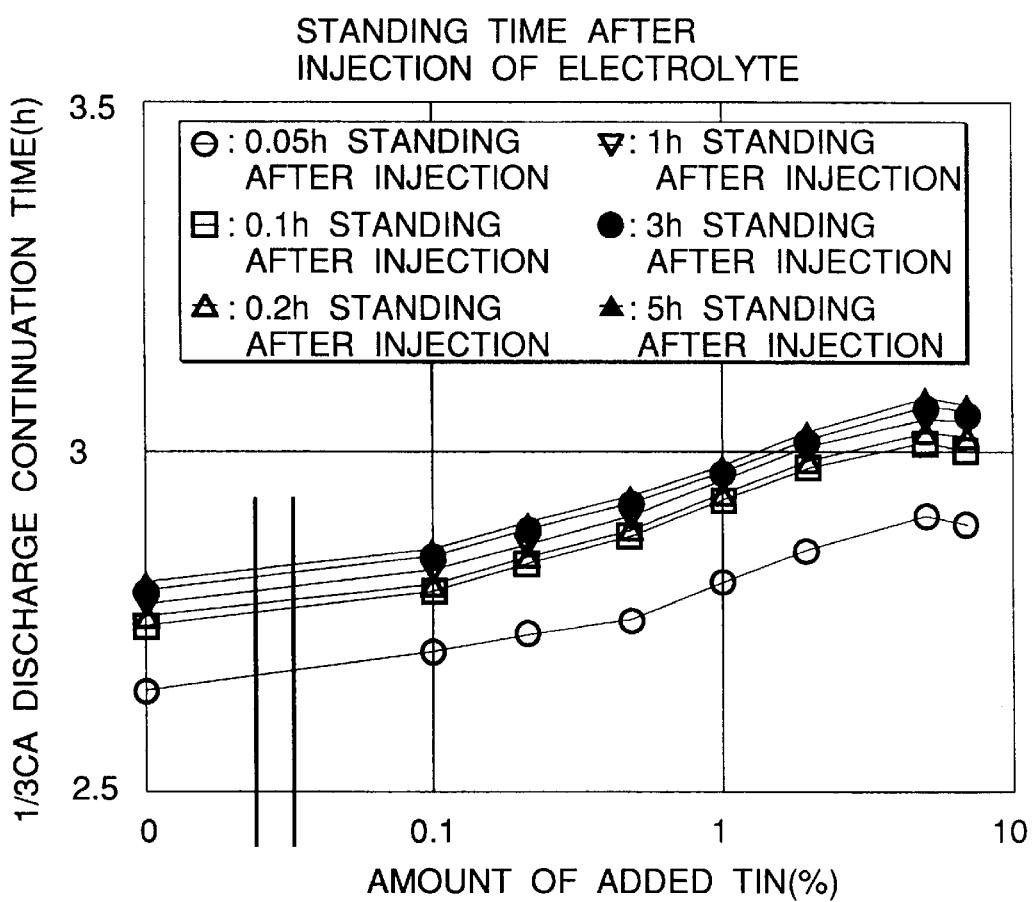
FIG. 4 is a characteristic diagram illustrating the relationship between the added amount of tin and the time during which the battery is allowed to stand after the injection of the electrolyte and the discharge capacity.

As can be seen in FIG. 4, when the time during which the battery is allowed stand after the injection of the electrolyte is not less than 0.1 hours, the initial capacity shows no significant difference with the time during which the battery is allowed stand after the injection of the electrolyte. However, when the time during which the battery is allowed stand after the injection of the electrolyte falls below 0.1 hours, the formation is insufficiently effected, thereby giving a low discharge capacity. This is probably because the formation begins before the electrolyte penetrates into the entire plate.

Figure 5:
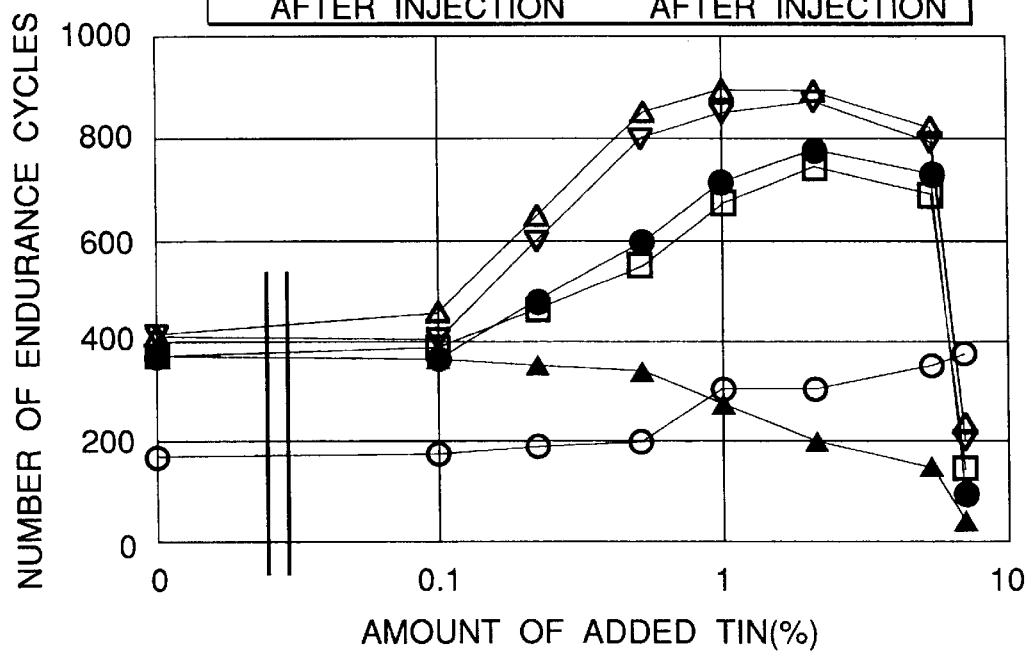
FIG. 5 is a characteristic diagram illustrating the relationship between the added amount of tin and the time during which the battery is allowed to stand after the injection of the electrolyte and the battery endurance.

The results of the endurance test are set forth in FIG. 5. When the time during which the battery is allowed stand for a period time between the injection of the electrolyte and the battery container formation is from not less than 0.1 hours to less than 3 hours, the battery shows a long endurance. The best effect can be exerted when time during which the battery is allowed stand for a period time between the injection of the electrolyte and the battery container formation is from not less than 0.2 hours to not more than 1 hour.

Figure 6:
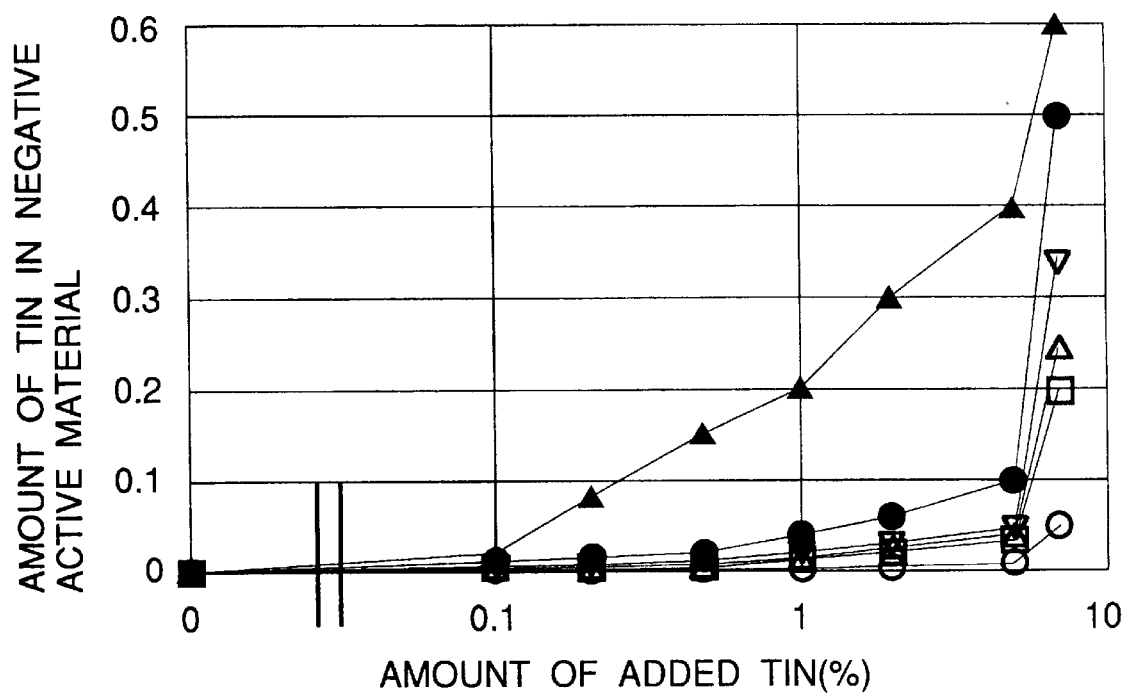
FIG. 6 is a characteristic diagram illustrating the relationship between the added amount of tin and the time during which the battery is allowed to stand after the injection of the electrolyte and the content of tin in the negative active material.

The batteries which had been subjected to battery container formation were disassembled, and then analyzed for the amount of tin accumulated on the negative plate. The results are set forth in FIG. 6. As similar to the results of the endurance test, when the amount of tin added in the positive active material is as defined herein and the time during which the battery is allowed to stand for a period of time between the injection of the electrolyte and the beginning of formation is not more than 3 hours, little or no deposition of tin takes place. However, when the time during which the battery is allowed to stand for a period of time between the injection of the electrolyte and the beginning of formation exceeds 3 hours or the amount of tin added in the positive active material exceeds 5%, the amount of tin deposited on the negative plate is significantly large.

It is unknown why the time during which the battery is allowed to stand after the injection of the electrolyte is related to the elution of tin. $PbO_2$ exerts an effect of adsorbing tin ion, etc. However, it is thought that $PbSO_4$ exerts little or no adsorbing effect. Further, it is thought that while the battery is allowed to stand after the injection of the electrolyte, sulfuric acid as electrolyte undergoes violent reaction with PbO in the plate, thereby causing the production of lead sulfate in the plate in a large amount impossible in ordinary charge-discharge. Hence, it is more likely that tin is eluted while the battery is allowed to stand after the injection of the electrolyte. Moreover, it is thought that when the battery container formation begins, tin occurs as anion complex in the electrolyte and further migrates toward the positive plate. It is thought that this mechanism causes little or no elution of tin during the battery container formation any more.

The present example has been described with reference to the application of the present invention to AGM type battery. Even if the present invention was applied to flooded type battery, similar effects were obtained.

EXAMPLE 3

A tin sulfate solution obtained by thoroughly stirring a mixture of tin sulfate with water for use in paste kneading was added to an active material in an amount of 0.1%, 0.2%, 0.5%, 1.0%, 2.0%, 5.0% and 7.0% based on the weight thereof as calculated in terms of tin. These pastes were filled into a grating made of Pb-0.08%Ca-1.5%Sn alloy, and then subjected to ripening to prepare unformed positive plates (active material density after formation: 3.9 g/cc) having a thickness of 2.2 mm.

Figure 7:
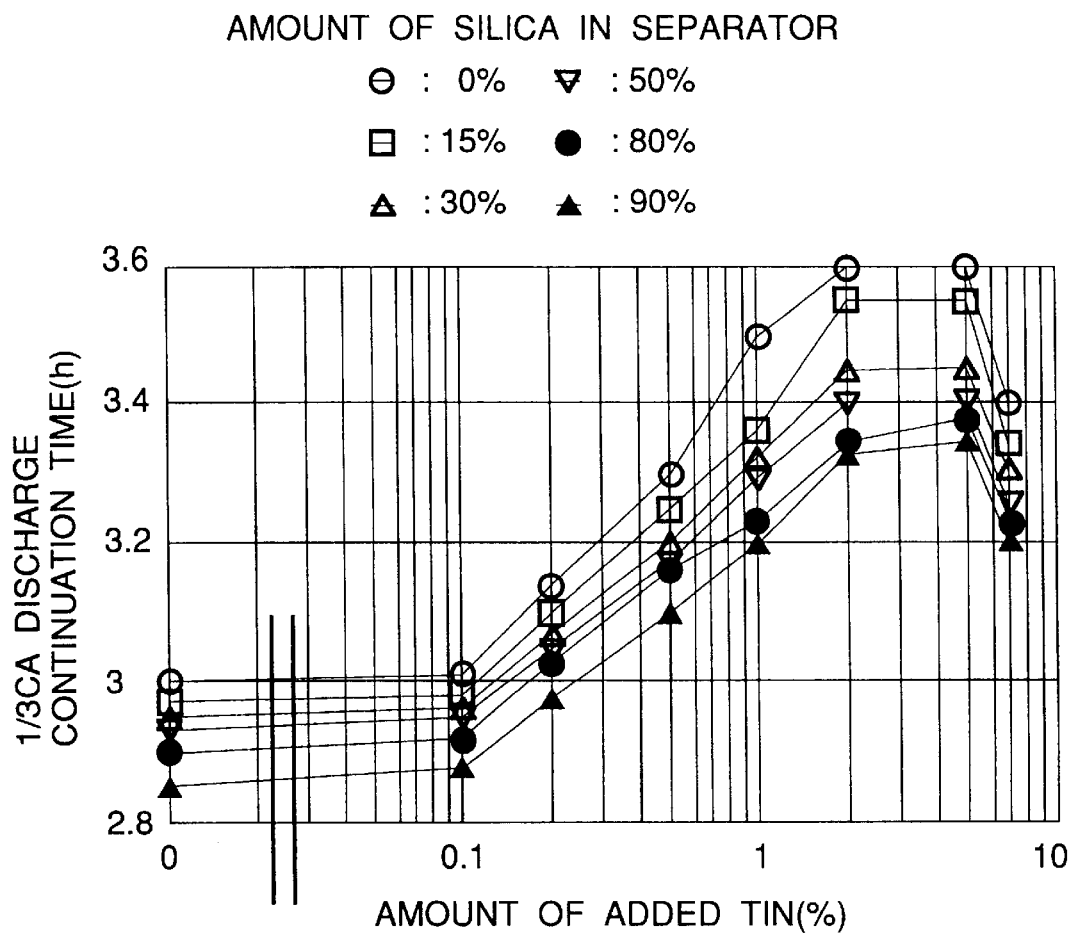
FIG. 7 is a characteristic diagram illustrating the relationship between the added amount of tin and the content of silica in the separator and the discharge capacity.

11 sheets of each of these positive plates, 12 sheets of unformed paste type negative plates having a thickness of 1.7 mm and a particulate glass fiber separator including powdered silica having a specific surface area of 200 m$^2$/g added therein in an amount of 15%, 30%, 50% and 80% were assembled into an about 60 Ah(3 hr)–12V AGM type valve-regulated lead-acid battery by an ordinary preparation method. A battery having a tin sulfate-free electrode plate was also prepared. These batteries were subjected to injection of electrolyte according to an ordinary method, allowed to stand for 6 hours, and then subjected to battery container formation at 7 A constant current for 64 hours. These batteries were measured for 1/3 CA discharge capacity at 30° C. The test results are set forth in FIG. 7. As can be seen in FIG. 7, when the amount of silica added in the separator is increased, the porosity of the separator is reduced, thereby causing a slight drop of discharge capacity. However, the battery having tin added in the positive active material in an amount of not less than 0.2% based on the weight thereof shows a capacity increase more than making up for the loss and thus has no practical problems.

Figure 8:
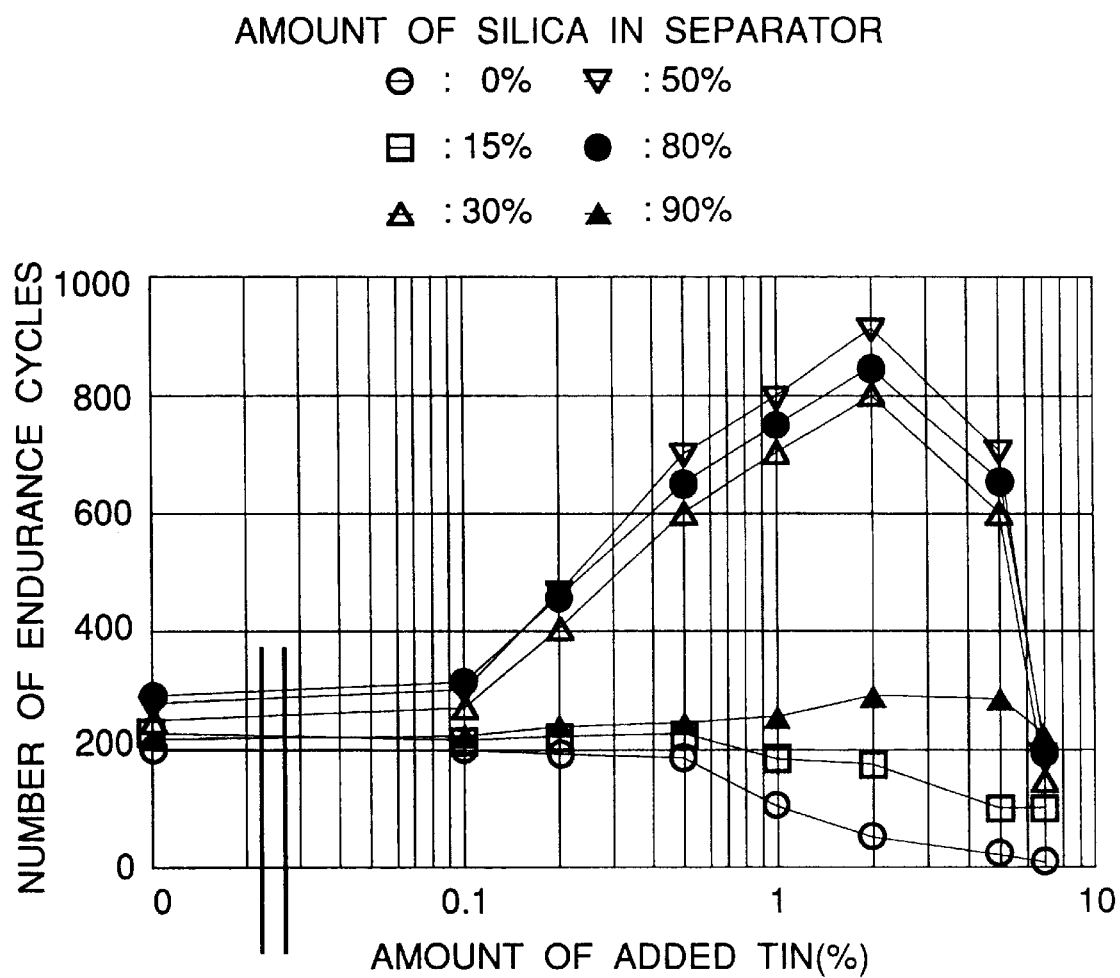
FIG. 8 is a characteristic diagram illustrating the relationship between the added amount of tin and the content of silica in the separator and the battery endurance.

These batteries were each subjected to endurance test. The endurance test was effected under ordinary conditions. The battery was discharged by 80% of the rated capacity at 40° C. and 1/3 CA constant current, and then charged by 110% of the charged capacity at 0.1 CA constant current. The test results are set forth in FIG. 8. The battery in which tin sulfate is added in the positive active material in an amount of from not less than 0.2% to not more than 5% and silica is added in the separator in an amount of from not less than 30% to not more than 80% shows less tin deposition on the negative plate and a longer endurance than those including the conventional separator free of silica. Further, the gelation of the electrolyte with colloidal silica retards the migration of tin eluted from the positive plate, thereby making it possible to further reduce the deposition of tin on the negative plate.

Similarly to the battery including the conventional separator free of silica, those including a separator having silica added therein in an amount of 15% or 90% early exhibits a capacity drop. The batteries including a separator having silica added therein in an amount of less than 30% show deposition of a large amount of tin on the negative plate. The batteries including a separator having silica added therein in an amount of 90% show a drastic capacity drop because the electrolyte cannot migrate sufficiently. The present example has been described with reference to the use of powdered silica having a specific surface area of 200 m$^2$/g. The similar test was effected with silica having various specific surface areas. As a result, the best effect can be exerted when powdered silica having a specific surface area of from 50 m$^2$/g to 500 m$^2$/g are used. When powdered silica having a specific surface area of not more than 50 m$^2$/g is used, tin eluted cannot be sufficiently caught, thereby causing deposition of a large amount of tin on the negative plate. When powdered silica having a specific surface area of more than 500 m$^2$/g is used, a tendency is observed for greater capacity drop probably because the electrolyte cannot sufficiently migrate.

As mentioned above, the addition of tin in the positive active material in an amount of from 0.2% to 5% and the restriction of the density of active material after formation to not less than 3.75 g/cc make it possible to provide remarkable improvement in the discharge properties and endurance of lead-acid battery. If the battery is subjected to battery container formation, the restriction of the time between the injection of the electrolyte and the beginning of battery container formation to a range of from not less than 0.1 hours to not more than 3 hours provides further improvement in the battery endurance. If the lead-acid battery is a valve-regulated type, the use of a fine glass fiber-based separator including powdered silica having a specific surface area of from 50 m$^2$/g to 500 m$^2$/g added therein in an amount of from not less than 30% to not more than 80% based on the weight thereof provides even further improvement in the battery endurance. The gelation of the electrolyte with colloidal silica provides even further improvement in the battery endurance. From this standpoint, the present invention has an extremely great industrial value.

What is claimed is:

1. A lead-acid battery comprising an electrolyte and a positive active material including tin in an amount of from not less than 0.5% to not more than 5% based on the weight thereof;
   wherein the density of said positive active material after formation is from not less than 3.75 g/cc to not more than 5.0 g/cc;
   wherein said led-acid battery is a valve-regulated lead-acid battery;

wherein said lead-acid battery comprises a fine glass fiber separator containing a powdered silica having a specific surface area of from 50 to 500 m$^2$/g added therein in an amount of weight not less than 30% to not more than 80% based on the weight thereof; and wherein said lead-acid battery is produced by a battery container formation method, and a time required between the injection of an electrolyte and the beginning of battery container formation is from not less than 0.1 hours to not more than 3 hours.

2. A lead-acid battery according to claim 1, wherein said time required between the injection of an electrolyte and the beginning of battery container formation is from not less than 0.2 hours to not more than 1 hour.

3. A lead-acid battery according to claim 1, wherein the time required between the injection of an electrolyte and the beginning of battery container formation is from not less than 42 minutes to not more than 3 hours.

4. A lead-acid battery according to claim 1, wherein the time required between the injection of an electrolyte and the beginning of battery container formation is from not less than 1 hour to not more than 3 hours.

5. A lead-acid battery according to claim 1, wherein the amount of tin is from not less than 0.1 wt % to not more than 5 wt %.

6. A lead-acid battery according to claim 1, wherein the amount of tin is from not less than 2.0 wt % to not more than 5 wt %.

7. A lead-acid battery according to claim 1, wherein said electrolyte is gelled with colloidal silica.

* * * * *